United States Patent
Bader et al.

[15] 3,676,459
[45] July 11, 1972

[54] 3-ARYLIMINO-1,2-DITHIOLS

[72] Inventors: Jorg Bader, Arlesheim; Karl Gatzi, Basle, both of Switzerland

[73] Assignee: Ciba-Geigy Corporation, Ardsley, N.Y.

[22] Filed: May 28, 1969

[21] Appl. No.: 828,766

[30] Foreign Application Priority Data

June 10, 1968 Switzerland ..................8595/68

[52] U.S. Cl. ...................................260/327 C, 424/277
[51] Int. Cl. ...........................................C07d 71/00
[58] Field of Search ...................................260/327 C

[56] References Cited

UNITED STATES PATENTS 3,530,145  9/1970  Klingsberg............................260/327

FOREIGN PATENTS OR APPLICATIONS

| | | |
|---|---|---|
| 698,869 | 5/1967 | Belgium..................................260/327 |
| 1,102,174 | 10/1961 | Germany................................260/327 |
| 1,504,150 | 12/1967 | France....................................260/327 |
| 698,869 | 5/1967 | Belgium..................................260/327 |

*Primary Examiner*—Henry R. Jiles
*Assistant Examiner*—Cecilia M. Shurko
*Attorney*—Karl F. Jorda and Frederick H. Rabin

[57] ABSTRACT

3-Arylimino-4-chloro-5-thio-1,2-dithiols are disclosed as antifungal agents, which are particularly useful for the protection of plants against phytopathogenic fungi. Antifungal compositions containing them as active ingredients are also described.

3 Claims, No Drawings

3-ARYLIMINO-1,2-DITHIOLS

DETAILED DISCLOSURE

The present invention concerns novel 3-arylimino-1,2-dithiols, processes for the production of these new compounds, agents for controlling phytopathogenic fungi containing these 1,2-dithiols as active ingredient, as well as methods of controlling phytopathogenic fungi using the novel active substances or agents containing them.

It has been found that the new 3-arylimino-1,2-dithiols of Formula I have superior fungicidal activity when compared with the 1,2-dithiol-3-one-5-yl sulfides known from the Belgian Pat. No. 698,869 and can be used as systemic fungicides.

The new 3-arylimino-1,2-dithiols correspond to the Formula I:

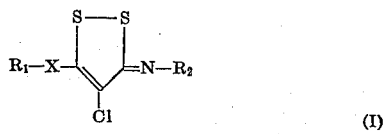

In this Formula:
$R_1$ represents lower alkyl or lower halogenoalkyl,
$R_2$ represents a phenyl radical any substituent of which is selected from chlorine, bromine, lower alkyl and lower alkoxy and
X represents sulfur or sulfonyl.

In Formula I, when $R_1$ represents lower alkyl, it represents straight or branched chain radicals having one to five carbon atoms, e.g. methyl, ethyl, n-propyl, isopropyl, n-butyl, isobutyl, tert-butyl, and pentyl radicals. Lower halogenoalkyl represents alkyl radicals having one to five carbon atoms — as listed above — which are mono- or poly-substituted by fluorine, chlorine and/or bromine. A substituted phenyl radical $R_2$ has preferably one to three substituents, in particular chlorine, bromine, lower alkyl or lower alkoxy, whereby, when there are several substituents, they may be the same or different. As lower alkyl-substituents, those mentioned above are suitable; these same radicals can form the alkyl moiety of alkoxy substituents.

The novel 3-arylimino-1,2-dithiols of Formula I are produced according to the invention by converting a 1,2-dithiol-3-one of Formula II:

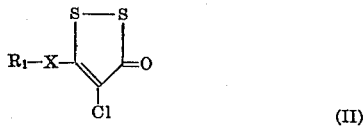

known from Belgium Pat. No. 698,869, with an inorganic or organic acid chloride into a 3,4-dichloro-1,2-dithiolium chloride of Formula III:

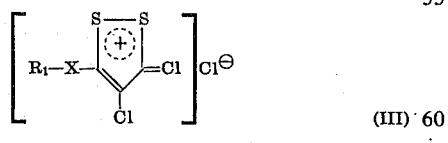

and reacting this with an amine of Formula IV:

$$R_2 - NH_2 \quad \quad IV$$

In Formulas II, III and IV the symbols $R_1$, $R_2$ and X have the meanings given for Formula I. The reactions are performed in the presence of solvents or diluents which are inert towards the respective reaction components. Suitable examples thereof are the following: hydrocarbons such as benzene, halohydrocarbons such as chloroform, trichloroethane, chlorobenzene, N,N-disubstituted carboxylic acid amides, nitriles, ether and ether-type compounds, etc.

For the reaction of the dithiolium chloride of Formula III with an amine of Formula IV, the addition of a base, especially a tertiary amine, is advisable.

According to another process, the new 3-arylimino-1,2-dithiols of Formula I are produced by reacting a 3-arylamino-4,5-dichloro-1,2-dithiol of Formula V:

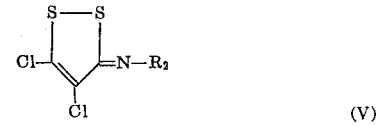

with a compound of Formula VI:

$$R_1 - X - Z \quad \quad VI$$

In Formulas V and VI, $R_1$, $R_2$ and X have the meanings given for Formula I, Z represents hydrogen or an alkali metal atom, particularly sodium or potassium. This reaction is also performed in the presence of solvents or diluents; those named above can, for example, also be used here.

Compounds of Formula VI which are suitable for the production of 1,2-dithiols of Formula I in which X represents sulfur are thiols or thiones which can be converted into thiols. For this process, these can be used as such or in the form of their alkali metal salts. In some cases it is advantageous to perform the reaction in the presence of an acid-binding agent such as in the presence of salts of weak acids, metalic oxides, tertiary amines, etc. For the production of compounds of Formula I in which X represents the $SO_2$—group, salts of sulfinic acids ($R_1 - SO_2H$), especially the sodium and potassium salts of the corresponding sulfinic acids, are used as starting materials of Formula VI.

The novel 3-arylimino-1,2-dithiols of Formula I have an excellent action against numerous phytopathogenic fungi. The new active substances are effective against fungi causing plant diseases, for example powdery mildews such as powdery mildew of cucumbers (*Erysiphe cichoracearum*) and powdery mildew of roses (*Sphaerotheca pannosa*); downy mildews such as those causing late blight on leaves and tubers of potatoes (*Phytophthora infestans*); leaf spot pathogens such as Alternaria solani; rusts such as bean rust (*Uromyces app.*); furthermore, grey mould (*Botrytis cinerea*) which is particularly difficult to control, etc. Since the 1,2-dithiols of Formula I also act as systemic fungicides, they can be used to protect plants and new growths thereon after treatment, against further fungal infections. The new active substances can also be used for the treatment of seeds without impairing germination. The active substances are used for the protection of plants in the form of solid or liquid preparations such as dusts or scattering agents, granulates, or dispersions (suspensions or emulsions). The concentrations of the active substance in the preparations required for plant protection are in the range of 0.01 to 2 percent of the weight of the preparations, the amount of active substance to be applied ranges between 0.1 and 7 kg/ha, depending largely, however, on the type of plants to be protected.

Several of the new active substances can also be used to control fungi and bacteria which infect other organic materials, in particular keratinic, cellulosic, and synthetic materials, and paints. The active substances can also be used for disinfection of the soil. They have only slight toxicity for warm-blooded animals.

The fungicidal action of the 3-arylimino-1,2-dithiols usable according to the invention was determined by the following test and effectiveness was compared with two dithiolones known from Belgian Pat. No. 698,869:

Action Against *Botrytis Cinerea* on *Vicia Faba* (Broadbeans)

Three well developed leaves of *Vicia faba* of equal size are placed into each test Petri dish which has been lined with moistened filter paper; the leaves are then sprayed until dripping wet with a liquor prepared from the active substance in the form of a wettable powder (0.1 percent active ingredient). After the spray coating has dried, the leaves are infected with a freshly prepared fungi spore suspension. After the leaves have been kept for one to two days in a moist atmosphere at 18°–20° C, in case of infection, black spots appear, at first in the form of tiny spots, which quickly spread out. The number and size of the infected spots serve as the criterion for measuring the effectiveness of the test substance.

Evaluation

The activity is evaluated according to the following scale:
10 = inactive, infection equal to that on untreated control plants
9–1 = linear decrease in infection
0 = no infection
+++ = burns, leaves destroyed.

*Botrytis Cinerea*

| Compound | Effect |
| --- | --- |
| 3-phenylimino-4-chloro-5-ethylthio-1,2-dithiol | 4 |
| 3-(4'-chlorophenylimino)-4-chloro-5-(2'-chloro- ethylthio)-1,2-dithiol | 2 |
| 4-chloro-5-ethylthio-1,2-dithiol-3-one* | 10 |
| 4-chloro-5-(2'-chloroethylthio)-1,2-dithiol-3-one* | +++ |

*known from Belgian patent No. 698,869

The following examples illustrate the production of the compounds of Formula I. Temperatures are given in degrees centigrade.

EXAMPLE 1

3-Phenylimino-4-chloro-5-ethylthio-1,2-dithiol 26.8 Parts of 3,4-dichloro-5-ethylthio-1,2-dithiolium chloride are suspended in 100 parts by volume of chloroform. While stirring and cooling with ice, a mixture of 9.1 parts of aniline, 10.1 parts of triethylamine and 100 parts by volume of benzene are added dropwise thereto. Stirring is continued for two more hours at 25° and then the mixture is concentrated by evaporation. The concentrated residue is dissolved in a mixture of 100 parts by volume of chloroform and 400 parts of water. The chloroform layer is separated, dried with magnesium sulfate and concentrated by evaporation. The concentrated residue is taken up in hot isopropanol and cooled, whereby 3-phenylimino-4-chloro-5-ethylthio-1,2-dithiol slowly crystallizes as yellow platelets, m.p. 38°–39°.

The following compounds were obtained in the manner described in Example 1, using the corresponding starting materials of Formulas III and IV:

| Compound | m.p. |
| --- | --- |
| 3-phenylimino-4-chloro-5-methylthio-1,2-dithiol | 94°–96° |
| 3-(4'-chlorophenylimino)-4-chloro-5-methylthio-1,2dithiol | 102°–103° |
| 3-(3',4'-dichlorophenylimino)-4-chloro-5-methylthio- 1,2-dithiol | 109°–112° |
| 3-(4'-chlorophenylimino)-4-chloro-5-ethylthio-1,2- dithiol | 76°–78° |
| 3-(4'-chlorophenylimino)-4-chloro-5-(2'-chloro- ethylthio)-1,2-dithiol | 99°–101° |

EXAMPLE 2

3-(4'-Chlorophenylimino)-4-chloro-5-ethylsulfonyl-1,2-dithiol

A mixture of 20 parts of 3-(4'-chlorophenylimino)-4,5-dichloro-1,2-dithiol, 15 parts of the sodium salt of ethane sulfinic acid and 50 parts of dimethyl formamide are stirred for six hours at 20° to 25°. The reaction product is then precipitated with ice water and recrystallized twice from benzene/cyclohexane. 11 Parts of 3-(4'-chlorophenylimino)-4-chloro-5-ethylsulfonyl-1,2-dithiol are obtained as orange colored platelets having a melting point of 117°–120°.

The 3,4-dichloro-1,2-dithiolium chlorides of Formula III, used as starting materials are produced as follows:

100 parts of 4-chloro-5-ethylthio-1,2-dithiol-3-one are refluxed for 50 hours with 200 parts by volume of chloroform and 100 parts by volume of oxalyl chloride. The solvent is then removed by distillation under reduced pressure and the crystalline residue obtained is extracted three times with 200 parts by volume of hot benzene each time. 91.5 parts (76 percent) of 3,4-dichloroethylthio-1,2-dithiolium chloride as orange colored needles with a decomposition point of 140° remain undissolved.

The production of fungicidal agents according to the invention is performed in a known manner by intimate mixing and grinding of active substances of the general Formula I together with suitable carriers, optionally with the addition of dispersing agents or solvents, which are inert towards the active substances. The active substances can be used and applied in the following forms:

solid preparations: dusts, scattering agents, granulates, coated granulates, impregnated granulates and homogeneous granulates;
water-dispersible concentrates of the active substance: wettable powders, pastes, emulsions;
liquid preparations: solutions, aerosols.

For the production of solid preparations (dusts, scattering agents, granulates) the active ingredients are mixed with solid carriers. Suitable particle size of the carrier is up to about 0.1 mm for dusts, from about 0.075 to 0.2 mm for scattering agents, and 0.2 mm or more for granulates. The concentration of active ingredient in the solid preparations is usually 0.5 to 80 percent by weight. These mixtures can also contain additives which stabilize the active ingredient and/or substances which are non-ionic or anionically or cationically active, which substances, for example, improve the adhesion of the active ingredients on plants or parts of plants (adhesives and agglutinants) and/or ensure a better wettability (wetting agents) and dispersibility (dispersing agents).

Water-dispersible concentrates of the active substance, wettable powders, pastes and emulsion concentrates, are agents which can be diluted with water to any desired concentration. They consist of active substance, carrier, optionally additives for stabilizing the active substance, surface-active substances and anti-foaming agents, and optionally solvents. The concentration of active substance in these preparations is from 5 to 80 percent by weight. The wettable powders and pastes are obtained by mixing and grinding the active substances with dispersing agents and pulverulent carriers in suitable equipment until the products are homogeneous. In some cases it is advantageous to use mixtures of different carriers. The anti-foaming agents may, for example, be silicones. The active substances are so mixed, ground, sieved and classified with the above-mentioned additives that in the wettable powders the solid fraction does not exceed a grain size of 0.02 to 0.04 and in pastes does not exceed 0.003 mm. Dispersing agents, organic solvents and water are used for the preparation of emulsion concentrates and pastes. The solvents must be practically odorless, non-phytotoxic, inert towards the active substances and not easily combustible.

Furthermore, the agents according to the invention may be applied in the form of solutions. For this purposes, one or more of the active substances of the general Formula I is or are dissolved in suitable organic solvents, mixtures of solvents, or water. The concentration of the active substances contained in the solutions should be in the range of 1 to 20 percent by weight. Other biocidal active substances or agents can be admixed with the agents described according to the invention. Thus, in addition to the said compounds of the general Formula I and other fungicides, the new agents may contain, for example, insecticides, herbicides, bactericides, fungistatic and bacteriostatic substances or nematocides in order to broaden the range of action. The agents according to the invention may also contain plant fertilizers, trace elements, etc.

Preparations containing the active substances, which are suitable for the protection of plants, are described below. Where not otherwise specifically stated, parts and percentages are expressed by weight.

Dusts

The following components are used for the preparation of a) a 10 percent and b) a 2 percent dust:
a. 10 parts of 3-phenylimino-4-chloro-5ethylthio-1,2-dithiol,
   5 parts of highly dispersed silicic acid,
   85 parts of talcum;
b. 2 parts of 3-(4'-chlorophenylimino)-4-chloro-5-ethylsulfonyl-1,2-dithiol,
   1 part of highly dispersed silicic acid,
   97 parts of talcum.

The above-named active substances are intimately mixed and ground with the carriers. The fungicidal dusting agents thus obtained serve for treating seed beds or for dusting plants.

Seed Dressings

The following are used for the preparation of a) a 10 percent and b) a 60 percent seed dressing:
a. 10 parts of 3-phenylimino-4-chloro-5-methylthio-1,2-dithiol,
   5 parts of kieselguhr,
   1 part of liquid paraffin,
   84 parts of talcum;
b. 60 parts of 3-(4'-chlorophenylimino)-4-chloro-5-methylthio-1,2-dithiol,
   15 parts of kieselguhr,
   1 part of liquid paraffin,
   24 parts of talcum.

The active substances mentioned are intimately mixed in a mixer with the carriers mentioned and the paraffin as distributing agent, and then ground. The pulverulent dressings obtained serVe for treating seeds of all types.

Granulates

The following components are used for the preparation of a) a 2.5 percent and b) a 5 percent granulate:
a. 2.5 parts of 3-(3', 4'-dichlorophenylimino)-4-chloro-5-methylthio-1,2-dithiol,
   2.5 parts of Kieselguhr,
   5 parts of polyethylene glycol,
   89.3 parts of ground limestone (0.4 – 0.8 mm),
   0.7 part of silicic acid;
b. 5 parts of 3-(4'-chlorophenylimino)-4-chloro-5-ethylthio-1,2-dithiol,
   1.5 parts of kieselguhr,
   0.5 part of cetyl polyglycol ether,
   87 parts of ground limestone,
   5 parts of polyethylene glycol,
   1 part of silicic acid.

The ground limestone is impregnated with the polyethylene glycol or the cetyl polyglycol ether, respectively, and then mixed with a mixture of the active substance mentioned, the kieselguhr and silicic acid. These granulates are particularly suitable for the disinfection of seed beds.

Wettable Powders

The following components are used for the preparation of a) 25 percent, b) and c) 40 percent, and d) 10 percent wettable powders:
a. 25 parts of 3-(4'-chlorophenylimino)-4-chloro-5-(2'-chlorethylthio)-1,2-dithiol,
   25 parts of kieselguhr,
   2 parts of hexadecyl glycol ether sulfate,
   1 part of sodium lauryl sulfate,
   7 parts of sodium lignin sulfate,
   40 parts of kaolin;
b. 40 parts of 3-phenylimino-4-chloro-5-ethylthio-1,2-dithiol,
   5 parts of dibutyl naphthyl sulfonate sodium salt,
   6 parts of naphthalene sulfonic acids/phenol sulfonic acids/formaldehyde condensation product (3:2:1),
   5 parts of Champagne chalk,
   3 parts of kaolin/polyvinyl alcohol mixture (1:1),
   30 parts of silicic acid (precipitated),
   11 parts of kaolin;
c. 40 parts of 3-(4'-chlorophenylimino)-4-chloro-5-ethylsulfonyl-1,2-dithiol,
   2 parts of oleyl methyl tauride sodium salt,
   6 parts of naphthalene sulfonic acids/phenol sulfonic acids/formaldehyde condensation product (3:2:1),
   2 parts of kaolin/polyvinyl alcohol mixture (1:1),
   20 parts of kaolin,
   30 parts of silicic acid (precipitated);
d. 10 parts of 3-phenylimino-4-chloro-5-methylthio-1,2-dithiol,
   10 parts of sodium lignin sulfonate,
   2 parts of a finely ground mixture of kaolin and polyvinyl alcohol (1:1),
   10 parts of kieselguhr,
   38 parts of kaolin,
   30 parts of Champagne chalk.

The active substances given are mixed with the carriers and dispersing agents, and finely ground. A wettable powder of excellent wettability and suspensibility is obtained. By dilution with water, suspensions of any desired concentration of active substance can be obtained from such wettable powders. They are suitable for the treatment of cultivated plants such as stone fruit trees and kernel fruit trees, and all types of decorative shrubs and plants.

Emulsion Concentrates

The following components are used to prepare a) a 5 percent b) a 10 percent, and c) a 15 percent emulsion concentrate:
a. 5 parts of 3-(4'-chlorophenylimino)-4-chloro-5-methylthio-1,2-dithiol,
   40 parts of dimethyl formamide,
   50 parts of petroleum (boiling range 230 – 270°),
   5 parts of composite emulsifier consisting of the calcium salt of dodecylbenzene sulfonic acid and a condensation product of ethylene oxide and caster oil (e.g. "Emullat WK", produced by Union Chimique Belge, S.A., Brussels);
b. 10 parts of 3-(3'-4'-dichlorophenylimino)-4-chloro-5-methylthio-1,2-dithiol,
   35 parts of dimethyl formamide,
   50 parts of petroleum (boiling range 230 – 270°),
   5 parts of the composite emulsifier given under a);
c. 15 parts of 3-(4'-chlorophenylimino)-4-chloro-5-ethylthio-1,2-dithiol,
   27 parts of dimethyl formamide,
   53 parts of petroleum (boiling range 230°– 270°),
   5 parts of the composite emulsifier given under a).

The active ingredient used is dissolved in petroleum or dimethyl formamide and the composite emulsifier is added to this solution. Emulsion concentrates are obtained which can be diluted with water to any concentration desired. Such emulsions are suitable for the treatment of cultivated plants such as roses, fruit trees, vegetables.

We claim:

1. A compound selected from a dithiol of the formula:

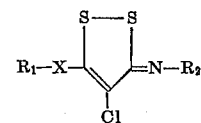

wherein
$R_1$ represents lower alkyl or lower halogenoalkyl,
$R_2$ represents phenyl or phenyl substituted by one or more members selected from the group consisting of chlorine, bromine, lower alkyl and lower alkoxy, and
X represents sulfur or sulfonyl 2. 3-Phenylimino-4-chloro-5-ethylthio-1,2-dithiol.

3. 3-(4-Chlorophenylimino)-4-chloro-5-(2'-chlorethylthio)-1,2-dithiol.

* * * * *